Jan. 15, 1963  L. KAUFMAN  3,073,554
FLIGHT CONTROL SYSTEM
Filed June 7, 1961  2 Sheets—Sheet 1

INVENTOR.
LAWRENCE KAUFMAN
BY
ATTORNEY

Jan. 15, 1963  L. KAUFMAN  3,073,554
FLIGHT CONTROL SYSTEM
Filed June 7, 1961  2 Sheets-Sheet 2

INVENTOR.
LAWRENCE KAUFMAN
BY
ATTORNEY

United States Patent Office 3,073,554
Patented Jan. 15, 1963

3,073,554
FLIGHT CONTROL SYSTEM
Lawrence Kaufman, Phoenix, Ariz., assignor to Sperry Rand Corporation, Great Neck, N.Y., a corporation of Delaware
Filed June 7, 1961, Ser. No. 115,353
14 Claims. (Cl. 244—77)

This invention relates in general to aircraft flight control systems and more particularly to a flight control system whose gain, i.e. the responsiveness of the system to correct for craft displacement from a reference attitude, is adjusted automatically to compensate for variations in the responsiveness of the aircraft itself to control surface deflections.

In designing an automatic flight control system consideration must be given to the fact that a flight control system, when employed in an aircraft, is but a portion of an overall control loop which includes the aircraft itself. Since the responsiveness of the aircraft to control surface deflections, which may be thought of as the aircraft gain, depends on its flight conditions, e.g. air speed, air density, angle of attack etc., the gain of the overall automatic pilot-aircraft control loop is in a state of change so long as the craft flight conditions change. In trying to keep the gain of the overall control loop constant, the flight control system gain itself is usually varied in accordance with changes in a particular flight condition, e.g. the flight control system gain is varied inversely with dynamic pressure. Since the gain or response of the aircraft depends on conditions other than dynamic pressure, this technique alone is at best only a partial solution to the problem at hand. Apparatus embodying the present invention provides a signal representing the aircraft gain itself and automatically adjusts the flight control system gain as an inverse function of such aircraft gain, thereby keeping the gain of the overall control loop constant at all times. Further discussion as to the desirableness of keeping the overall control loop gain constant follows.

A principal object of the invention is to provide aircraft flight control apparatus, the gain or responsiveness of which varies inversely with the gain or responsiveness of the aircraft to control surface deflections in which it is employed.

Another object of the invention is to provide apparatus for producing a signal representing the responsiveness of an aircraft to control surface deflections.

Another object of the invention is to provide flight control apparatus which, when employed in an aircraft, causes the natural frequency of the aircraft-flight control system control loop to be invariant.

Another object of the invention is to provide a variable gain autopilot, the damping ratio of which is invariant regardless of variations in the gain of the autopilot.

The invention will be described with reference to the figures wherein.

Figure 1:
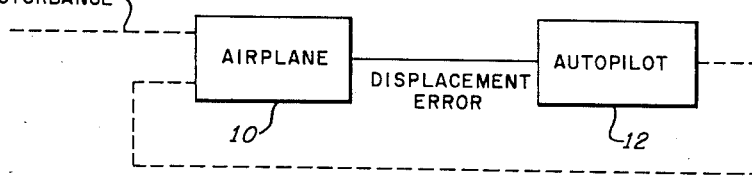
FIG. 1 is a block diagram useful in describing the invention.

Referring to FIG. 1, a typical airplane-autopilot control loop has an airplane 10 applying a displacement error signal to an autopilot 12, such displacement error signal being produced whenever the airplane attitude differs from a reference attitude. The autopilot 12, in response to its input or command signal, moves a control surface (not shown) on the airplane 10 to produce a moment on the airframe in a direction and an amount to bring the airplane back to its reference attitude, thereby cancelling the displacement error signal. The airplane 10 might be moved from its reference attitude by a disturbance such as a wind gust or by any other command.

When the response of the airplane 10 is low, i.e. the airplane gain is low because of its flight conditions, the autopilot 12 must follow up instantly to move the substantially ineffective control surfaces of the airplane 10 and thereby prevent the displacement error from exceeding a predetermined tolerable level. Otherwise, i.e. with slow follow-up, the displacement error will exceed its maximum tolerable level before the autopilot can even start to effect its cancellation. To assure rapid follow-up under the aforedescribed conditions, the gain of the autopilot 12 must be maintained suitably high. However, high gain autopilots, similarly, present problems when cooperating with "high gain" airplanes. For example, spurious noise signals which cause the autopilot to move the craft control surfaces will cause a "high response" airplane to try to follow each and every spurious movement of its control surfaces and will, therefore, cause the control and movement of the airplane 10 to be jittery. Under these circumstances, it is desirable to reduce the responsiveness of the autopilot, i.e. reduce its gain, to a suitable low level at which jitter ceases to be a problem.

Figure 2:
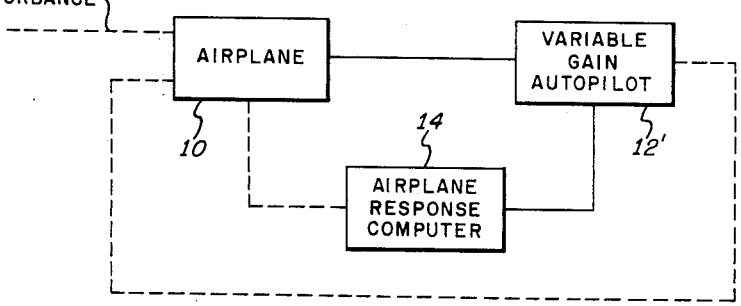
FIG. 2 is another block diagram useful in describing the invention.

FIG. 2 shows the control loop of FIG. 1 as improved by the present invention. An airplane response computer 14, the description of which follows later, provides a signal representing the gain of the airplane 10 and applies that signal to a variable gain autopilot 12'. The signal from the airplane response computer then operates (as will be described later) to vary the gain of the autopilot 12' as an inverse function of the airplane gain. Therefore, when the gain of the airplane 10 increases, the gain of the autopilot 12' decreases; conversely, when the airplane gain decreases, the autopilot gain increases. Such operation keeps the gain of the overall airplane-autopilot control loop substantially constant and, therefore, the loop has a substantially fixed natural frequency, this latter feature being desirable because it provides an invariant environment for other equipments installed aboard the airplane.

A measure of the gain of the airplane, as provided by the airplane response computer 14, is determined by measuring the response of the airplane to a control surface deflection producing that response. For example, by measuring the pitch acceleration per elevator deflection, a measure of the gain of the airplane about its pitch axis may be provided. Where the pitch acceleration produced by a given small deflection of the elevator is considerable, the airplane gain is substantial; where the pitch acceleration produced by the same given elevator deflection is slight, the airplane gain is low.

The airplane response computer 14 output signal, hereinafter called the control power signal, is produced by dividing a signal representing the craft angular acceleration about one of its axes by a signal representing the deflection of the control surface associated with that axis, e.g. pitch acceleration is divided by elevator deflection, yaw acceleration is divided by rudder deflection etc. The control power signal is applied then to the variable gain autopilot 12' and, as earlier stated, varies the autopilot gain inversely as a function of such control power. By so doing, two useful qualities are built automatically into the airplane-autopilot control loop: first, in the event that a gust causes a large pitch acceleration with no attendant elevator deflection, the control power signal will be extremely large and will cut the autopilot gain to a point at which the autopilot is virtually ineffectual. Under this condition the airplane 10 will tend to become aerodynamically stabilized and will oscillate at its own natural frequency instead (as is the normal case) of translationally accelerating in altitude, such gust-produced translational accelerations causing considerable discomfort to the airplane passengers and possible damage to cargo. The second useful quality results at the instant the pilot himself introduces a surface deflection command, e.g. at the instant the pilot commands an elevator deflection. At this instant, there is a finite elevator deflection and no accompanying pitch acceleration; this causes the control power signal to be at a minimum and the gain of the autopilot 12' becomes maximum, thereby enhancing the command capabilities of the autopilot by increasing its sensitivity.

Figure 3:
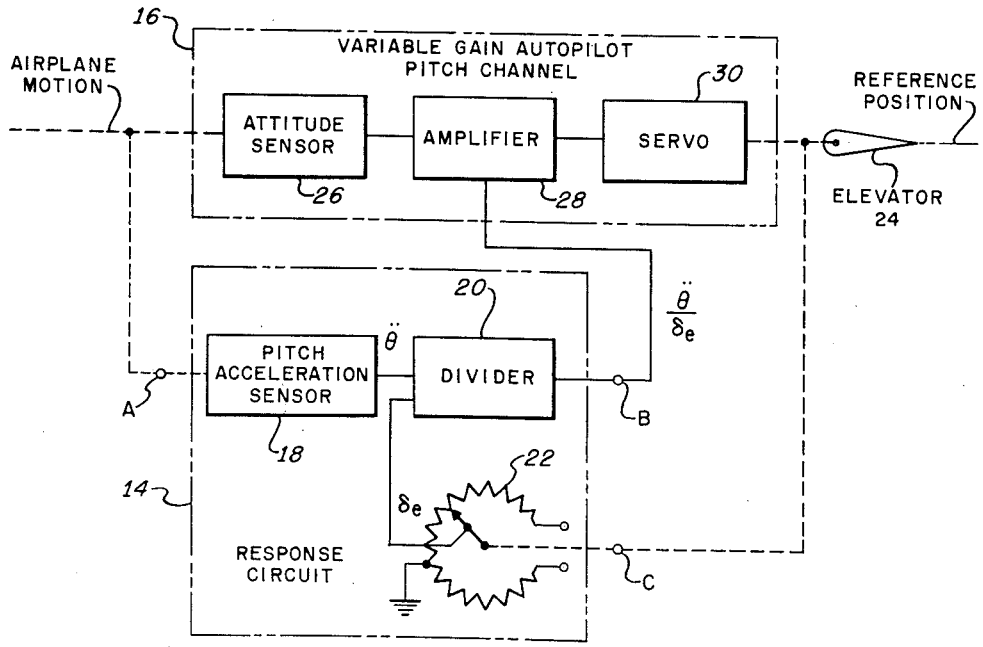
FIG. 3 is a block diagram of apparatus embodying the invention.

Referring to FIG. 3, the pitch axis portions of an autopilot and a response computer are shown by way of example, it being understood that the roll and yaw axes may be provided with equipment substantially identical in form to that of the pitch axis. In FIG. 3, the response computer 14 includes a pitch angular acceleration sensor 18 which, in its presently preferred form, comprises a pair of spaced apart linear accelerometers such as is disclosed in U.S. Patent 2,487,793, issued to D. E. Esval and assigned to the present assignee. The pitch acceleration signal from the sensor 18 is applied to a divider 20, e.g. the divider shown and described in Electronic Analog Computers, Korn and Korn, McGraw Hill Book Company, New York, FIG. 6.57(a). A potentiometer 22, the wiper of which is positioned in proportion to the deflection of an elevator 24 from a reference or normal trim position, applies a signal representing such elevator deflection to the divider 20. The divider 20 functions to provide an output signal representing the quotient of the pitch acceleration divided by the elevator deflection, i.e. the divider 20 output signal represents the pitch axis control power. The pitch channel 16 of the autopilot has an attitude sensor 26 which provides a signal representing the airplane displacement in pitch from a reference pitch attitude. The attitude sensor 26, which may be a vertical gyro of conventional configuration, applies its outut signal to a variable gain element of the autopilot system such as, for example, a variable amplifier 28. The amplifier 28 receives, also, the pitch control power signal from the divider 20 and has its gain varied as an inverse function of such control power, e.g. by varying the bias of the amplifier 28 in proportion to the magnitude of the control power signal. The output signal from the amplifier 28 is applied to a position servo 30 which varies the position of the elevator 24 to cause the craft to assume its reference position.

Figure 4:
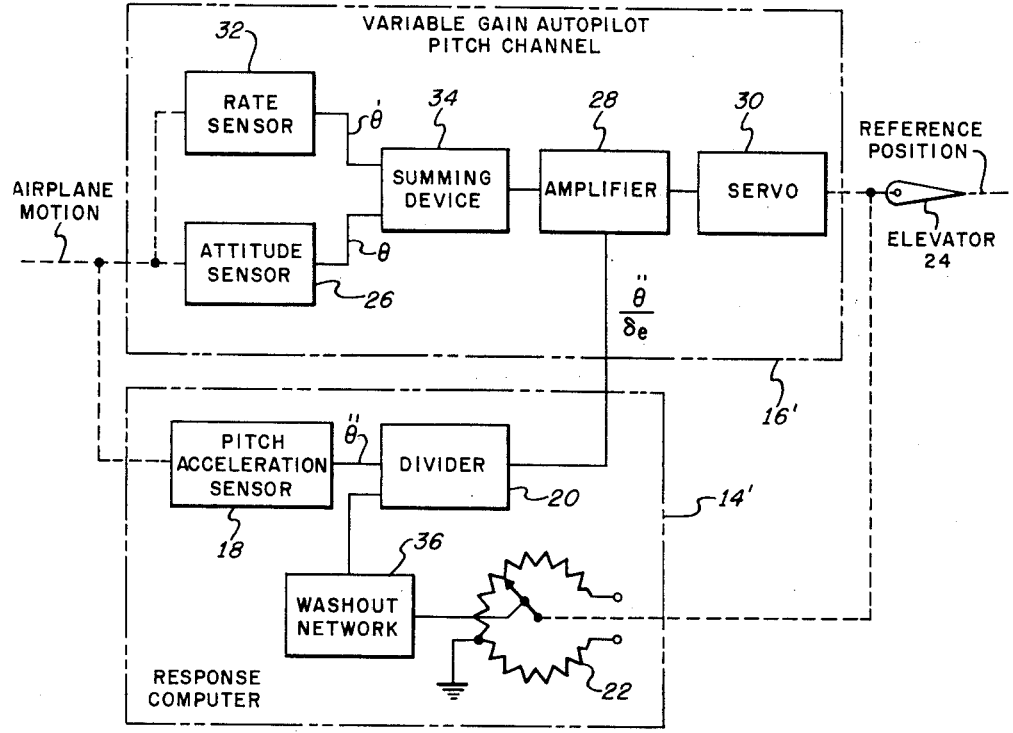
FIG. 4 is a block diagram of a presently preferred form of the invention.

Referring to FIG. 4, the presently preferred form of the invention shows a variable gain pitch channel 16' having an attitude sensor 26 (which provides a displacement signal) and a pitch rate sensor 32 (which provides a stability augmentation signal), each of which applies its output signal to a conventional summing device 34. The summing device 34 output signal is, in turn, applied to the amplifier 28, the output of which, as before, serves to control the operation of the servo 30.

Since the neutral, i.e. trimmed, position of the elevator 24 may be different from the elevator streamline, or reference, position, the apparatus of FIG. 4 is provided with a washout network 36, the purpose of which is to eliminate or filter out any steady elevator deflection signal produced by the potentiometer 22. By so doing, signals representing elevator deflections which are necessary to maintain a particular trimmed attitude for the airplane are not seen by the divider 20, thereby making the divider 20 output signal always representative of the pitch control power of the airplane. The divider 20 output signal is applied to the amplifier 28 and, as before, such signal varies the amplifier gain inversely as a function of the airplane pitch control power. Since the autopilot pitch channel 16' has its gain varied constantly, the apparatus of FIG. 4 sums the displacement signal and the stability augmentation signal at a point prior to the "gain changing" means or amplifier 28; such technique operates to keep the damping ratio for the pitch channel 16' constant, i.e. the ratio of the stability augmentation signal to the displacement signal is a constant.

Figure 5:
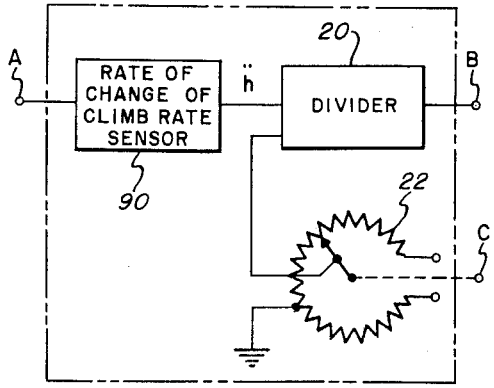
FIG. 5 shows one form of airplane response computer employing the invention.
Figure 6:
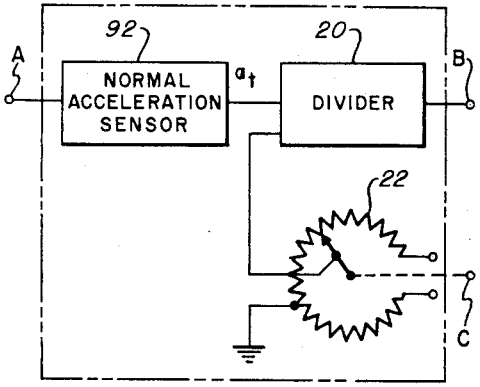
FIG. 6 is a block diagram of another form of airplane response computer employing the invention.

As was stated earlier, control power is a measure of the response of the airplane to a control surface deflection producing that response; therefore, the present invention lends itself readily to several airplane response computer variations, two of which are shown respectively in FIGS. 5 and 6. The apparatus of FIG. 5 is identical to the response computer 14 of FIG. 3 with one exception: a sensor 40 that senses the rate that the airplane changes its rate of climb, i.e. the airplane's vertical acceleration, is substituted for the pitch angular acceleration sensor 18. The response computer of FIG. 5, therefore, provides a signal representing the responsiveness of the airplane to change its rate of climb when its elevator is deflected. FIG. 6, likewise, sets forth apparatus identical to the response computer 14 with one exception: a normal acceleration sensor 42 is substituted for the pitch acceleration sensor 18. The apparatus of FIG. 6, therefore, provides a signal representing the responsiveness of the airplane to accelerate normally when its elevator is deflected, this acceleration being felt by the pilot as he is forced more or less into his seat in response to elevator deflections.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for producing a signal representing the responsiveness of an aircraft to a force tending to move the craft about one of its axes comprising means producing a signal representing said force, means producing a signal representing the transitional movement of the craft in response to said force, and means adapted to receive said force and transitional movement signals producing a signal representing the quotient of the movement signal divided by said force signal, said quotient signal being representative of the craft responsiveness about the axis.

2. Apparatus for producing a signal representing the responsiveness of an aircraft to control surface deflections comprising means producing a signal representing the amount said control surface is deflected, means producing a signal representing the transitional movement of said craft caused by said surface being deflected, and means receiving said surface deflection signal and said transitional movement signal producing a signal representing the quotient of the craft movement signal divided by the deflection signal, said quotient signal being representative of the craft responsiveness.

3. Apparatus for producing a signal representing the responsiveness of an aircraft to control surface deflections tending to move said craft about an axis thereof comprising means producing a signal representing the amount said control surface is deflected, means producing a signal representing the angular acceleration of said craft about said axis caused by said surface being deflected, and means receiving said surface deflection signal and said angular acceleration signal producing a signal representing the quotient of the acceleration signal divided by the deflection signal, said quotient signal being representative of the craft responsiveness.

4. Apparatus for controlling the flight of an aircraft comprising servo means operable with a control surface on said craft to correct for departures of said craft from a reference attitude, said servo being adapted to have its gain varied, means producing a signal representing the transitional motion of said craft in departing from its reference attitude, means producing a signal representing the amount that said control surface is deflected, means adapted to receive the motion and surface deflection signals producing a signal representing the quotient of the motion signal divided by the deflection signal, said quotient signal being applied then to said servo means to increase and decrease the gain of said servo when the magnitude of said quotient signal respectively decreases and increases.

5. Apparatus for controlling the flight of an aircraft comprising autopilot means responsive to move a control surface on the craft to correct thereby for craft displacements from a reference attitude, said autopilot being adapted to have its responsiveness varied, means producing when said craft departs from its reference attitude a signal representing the quickness of the departure, means producing a signal representing the amount said control surface deflects from a neutral position, means producing a signal representing the resultant of dividing the control surface deflection signal into said other signal, said resultant signal being applied to said autopilot means to increase and decrease proportionally its responsiveness when the magnitude of the resultant signal respectively decreases and increases.

6. Flight control apparatus comprising a variable gain autopilot, means producing a signal representing the craft angular acceleration about one of its axes, means producing a signal representing the deflection of a craft control surface that can effect such angular acceleration, means receiving said acceleration and deflection signals producing a signal representing the quotient of the acceleration divided by the surface deflection, said quotient signal being applied to said variable gain autopilot to increase and decrease its gain when the magnitude of the quotient signal respectively decreases and increases.

7. Apparatus for satisfactorily controlling the flight of an aircraft regardless of changes in the flight conditions of the craft comprising autopilot means the responsiveness of which is variable, means producing a signal representing the angular acceleration of the craft about one of its axes, means producing a signal representing the deflection of a control surface associated with craft control about that axis, means receiving the acceleration and deflection signals producing a signal representing the quotient of the craft angular acceleration divided by the control surface deflection, said quotient signal being applied to said autopilot means, said quotient signal operating to increase and decrease the responsiveness of the autopilot means when the quotient respectively decreases and increases.

8. Flight control apparatus comprising a variable gain autopilot, means producing a signal representing the craft angular acceleration about one of its axes, means producing a signal representing short term deflections of a craft control surface that can effect such angular acceleration, means receiving said acceleration and deflection signals producing a signal representing the quotient of the acceleration divided by the surface deflection, said quotient signal being applied to said variable gain autopilot to increase and decrease its gain when the magnitude of the quotient signal respectively decreases and increases.

9. Apparatus for satisfactorily controlling the flight of an aircraft regardless of changes in the flight conditions of the craft comprising autopilot means the responsiveness of which is variable, means producing a signal representing the angular acceleration of the craft about one of its axes, means producing a signal representing short term deflections of a control surface associated with craft control about that axis, means receiving the acceleration and deflection signals producing a signal representing the quotient of the craft angular acceleration divided by the control surface deflection, said quotient signal being applied to said autopilot means, said quotient signal operating to increase and decrease the responsiveness of the autopilot means when the quotient respectively decreases and increases.

10. Flight control apparatus comprising a variable gain autopilot, means producing a signal representing the craft angular acceleration about one of its axes, means producing a signal representing the deflection of a craft control surface that can effect such angular acceleration, means receiving said deflection signal washing out any long term components of said signal, means receiving said acceleration and washed out deflection signals producing a signal representing the quotient of the acceleration divided by the surface deflection, said quotient signal being applied to said variable gain autopilot to increase and decrease its gain when the magnitude of the quotient signal respectively decreases and increases.

11. The apparatus of claim 4 wherein the means producing a signal representing the transitional motion of the craft is a sensor producing a signal representing the rate that the craft changes its rate of climb.

12. The apparatus of claim 4 wherein the means producing a signal representing the transitional motion of the craft is a sensor producing a signal representing the normal acceleration of the craft.

13. In a control system for aircraft having a control surface for controlling movement of the craft about an axis thereof, the combination comprising means for providing a first signal having a value corresponding to the deflection of said control surface from a reference position, means for providing a second signal variable in accordance with the movement of the aircraft about said axis, and computer means connected to receive both of said signals for providing an output signal variable in accordance with the ratio of said second signal to said first signal.

14. An automatic control system for aircraft having a control surface for controlling the attitude of the craft about an axis thereof, said automatic control system being responsive to input signals and operative to move said control surface in a direction and to an amount to reduce said input signals toward zero, means for varying the response of said automatic control system to said input signals, means for providing a signal corresponding to the deflection of said control surface from a reference position, means for providing a second signal corresponding to the movement of said aircraft about said axis, computer means connected to receive said first and second signals and for providing an output signal variable in accordance with the quotient of said second signal divided by said first signal, and means for applying said output signal to said response varying means to thereby vary the response of said automatic control system in accordance with said output signal.

References Cited in the file of this patent
UNITED STATES PATENTS

| | | |
|---|---|---|
| 2,763,838 | McConnell | Sept. 18, 1956 |
| 2,981,500 | Carlton | Apr. 25, 1961 |